United States Patent
Mous et al.

(10) Patent No.: US 8,596,293 B2
(45) Date of Patent: Dec. 3, 2013

(54) WATER APPLIANCE HAVING A FLOW CONTROL UNIT AND A FILTER ASSEMBLY

(75) Inventors: Frans Mous, Drachten (NL); Sander De Jonge, Drachten (NL)

(73) Assignee: Koninklijke Philips N.V., Eindhoven (NL)

( * ) Notice: Subject to any disclaimer, the term of this patent is extended or adjusted under 35 U.S.C. 154(b) by 175 days.

(21) Appl. No.: 12/993,484

(22) PCT Filed: May 20, 2009

(86) PCT No.: PCT/IB2009/052102
§ 371 (c)(1), (2), (4) Date: Nov. 19, 2010

(87) PCT Pub. No.: WO2009/144630
PCT Pub. Date: Dec. 3, 2009

(65) Prior Publication Data
US 2011/0061748 A1    Mar. 17, 2011

(30) Foreign Application Priority Data

May 30, 2008    (EP) ...................................... 08157314

(51) Int. Cl.
*F16K 21/18*    (2006.01)
(52) U.S. Cl.
USPC ........... 137/398; 137/400; 137/415; 137/428; 137/436; 137/442; 137/448; 137/487.5; 137/544
(58) Field of Classification Search
USPC ............ 137/101.27, 398, 400, 409, 415, 428, 137/434, 436, 442, 448, 487.5, 544
See application file for complete search history.

(56) References Cited

U.S. PATENT DOCUMENTS

| | | | | |
|---|---|---|---|---|
| 759,131 | A | * | 5/1904 | Rowinsky ...................... 417/39 |
| 2,023,073 | A | * | 12/1935 | Harman ........................ 137/434 |
| 2,226,533 | A | * | 12/1940 | Macgeorge et al. .......... 137/433 |
| 2,559,046 | A | * | 7/1951 | Peters et al. ................... 251/238 |
| 2,818,877 | A | * | 1/1958 | Swanson ....................... 137/135 |
| 2,835,270 | A | * | 5/1958 | York et al. .................... 137/412 |
| 3,079,943 | A | * | 3/1963 | Oleskow ....................... 137/391 |
| 3,908,206 | A | * | 9/1975 | Grewing .......................... 4/508 |
| 4,101,174 | A | * | 7/1978 | Miller ............................. 406/12 |
| 4,640,307 | A | * | 2/1987 | Roberts ......................... 137/448 |
| 4,681,677 | A | | 7/1987 | Kuh et al. |
| 4,698,164 | A | | 10/1987 | Ellis |

(Continued)

FOREIGN PATENT DOCUMENTS

DE    2817704 A1    10/1979
DE    3242750 A1    5/1984

(Continued)

OTHER PUBLICATIONS

Machine Translation of Schopf, DE 19706564 (from EPO website).*

(Continued)

*Primary Examiner* — Craig Schneider
*Assistant Examiner* — Jessica Cahill

(57) ABSTRACT

A water appliance including a water flow control unit for controlling a water flow. The control unit includes a flow restrictor and a leakage stop in serial fluid communication with the flow restrictor. The leakage stop cuts off the flow when a pressure difference between an inlet and an outlet of the flow restrictor is below a predetermined value.

10 Claims, 12 Drawing Sheets

(56) References Cited

U.S. PATENT DOCUMENTS

| | | | |
|---|---|---|---|
| 4,762,142 A * | 8/1988 | Tams | 137/315.08 |
| 4,769,135 A | 9/1988 | Norton | |
| 4,777,990 A * | 10/1988 | Grant | 141/201 |
| 4,796,650 A * | 1/1989 | Hwang | 137/443 |
| 5,168,891 A * | 12/1992 | Green et al. | 137/114 |
| 5,655,232 A * | 8/1997 | Buckwalter | 4/508 |
| 5,882,507 A | 3/1999 | Tanner et al. | |
| 5,928,504 A | 7/1999 | Hembre et al. | |
| 6,178,994 B1 * | 1/2001 | Park | 137/413 |
| 6,966,334 B2 * | 11/2005 | Bolster | 137/434 |
| 7,610,117 B2 * | 10/2009 | Brodeur et al. | 700/281 |
| 2001/0003286 A1 * | 6/2001 | Philippbar et al. | 137/624.12 |
| 2002/0195145 A1 * | 12/2002 | Lowery et al. | 137/487.5 |
| 2005/0189018 A1 * | 9/2005 | Brodeur et al. | 137/487.5 |
| 2006/0027267 A1 * | 2/2006 | Fritze | 137/487.5 |
| 2006/0032544 A1 * | 2/2006 | Malenfant et al. | 138/46 |
| 2008/0302987 A1 * | 12/2008 | Corriveau | 251/129.04 |

FOREIGN PATENT DOCUMENTS

| | | | |
|---|---|---|---|
| DE | 3527519 A1 | | 2/1987 |
| DE | 3810998 A1 | | 10/1989 |
| DE | 19706564 A1 | | 8/1998 |
| DE | 19814903 A1 | | 10/1999 |
| DE | 19942122 A1 | | 3/2001 |
| DE | 19944830 A1 | | 3/2001 |
| EP | 0351061 A2 | | 1/1990 |
| FR | 2506888 A1 | | 12/1982 |
| JP | 57043075 A | | 3/1982 |
| JP | 58135434 A | | 8/1983 |
| JP | 2002102615 A | | 4/2002 |
| KR | 2001-0097687 | * | 11/2001 |
| KR | 20010097687 A | | 11/2001 |
| KR | 100466317 B1 | | 1/2005 |
| KR | 2005017974 A | | 2/2005 |
| WO | 2005095916 A1 | | 10/2005 |

OTHER PUBLICATIONS

Schlunder et al: "VDI-Warmeatlas"; VDI, Dusseldorf 5, 1988, 3 Page Document.

* cited by examiner

WATER APPLIANCE HAVING A FLOW CONTROL UNIT AND A FILTER ASSEMBLY

FIELD OF THE INVENTION

The invention is related to a water appliance having a water flow control unit for controlling a water flow and to a filter assembly.

BACKGROUND OF THE INVENTION

Lack of access to clean water is a leading cause of death and disease in a lot of countries, killing many people annually and causing a wide variety of illnesses. Water treatment is necessary to alleviate the health conditions of people and to protect from the ill effects acquired from the consumption of unsafe or contaminated water. In many countries water is a scarce and expensive resource. Methods for waste water treatment have a wide interest associated with the energy consumed by such water treatment. Although waste water can be recycled and re-used it is generally considered of importance to avoid unnecessary spillage of water. Such spillage may occur as a result of leakage caused by e.g. poor maintenance of faucets, faulty pipe connections or worn-out gaskets in various components of water systems or by inattentive closure of faucets, water taps and the like.

Water appliances having a water flow control unit are generally applied for water treatment and may serve various conditioning purposes such as cooling, heating or cleaning of water. They may also serve as a means for dosage of an amount of water tapped from a reservoir or public water system. Water appliances can be incorporated into a public water system or can be used in a domestic environment as under-the-counter appliances which filter water prior to reaching the faucet or as a terminal end device which may be faucet mounted. Water appliances can treat water by means of mechanical filtration to prevent passage of particulates or by chemical treatment of water.

SUMMARY OF THE INVENTION

It is an object of the present invention to provide a water appliance of the kind set forth in the opening paragraph which prevents leakage of water in the absence of a demand for water.

According to the invention this object is realized in that the control unit includes a flow restrictor and a leakage stop in serial fluid communication with the flow restrictor, which leakage stop cuts off the flow below a predetermined value of a pressure difference between an inlet and an outlet of the flow restrictor.

The control unit controls the water flow. During normal water demand the water flow through the appliance and through the flow restrictor will cause a drop of pressure between the inlet of the restrictor and the outlet of the restrictor. It is generally known, that a voluminal flow of water—which is incompressible—through a restriction has the effect of a pressure drop over the restriction, i.e. a pressure difference between an inlet and an outlet of the flow restriction. The magnitude of the pressure drop increases at an increasing flow and decreases if the water flow reduces or stops, e.g. in a situation where the user closes the faucet in the absence of further demand for water. If the water flow is of a magnitude which is below a predetermined and minimal flow of water, it can be assumed that there is no demand for water which is actually intended by the user; such a low water flow below said predetermined and minimal flow indicates leakage of water and said predetermined and minimal flow of water will be referred to as the leakage limit of the flow.

The leakage limit corresponds to the predetermined value of a pressure difference between the inlet and the outlet of the flow restrictor of the control unit according to the invention. When the flow through the restrictor decreases and reaches the leakage limit, the predetermined value of the pressure difference over the restrictor is established and the leakage stop cuts off the flow. The leakage stop being in serial fluid communication with the flow restrictor, the flow through the restrictor is cut-off as a consequence. Hence, there will be no pressure difference between the inlet and the outlet of the flow restrictor, implying that the pressure difference will stay below the predetermined pressure difference corresponding to the leakage limit. The cut-off state will be maintained until the control unit detects a new and intended demand for water and cancels the closure of the leakage stop and the corresponding cut-off of water flow, e.g. by provision of a signal to the leakage stop to open up the serial passage to the flow restrictor. Such detection by the control unit of a demand and the provision of an opening signal can be accomplished by commonly known features which are known to the skilled person per se; they do not form a part of the invention and are not essential to realise the above mentioned object.

In an advantageous embodiment of the water appliance according to the invention the appliance has a water filter and a flow totalization unit for adding up a volume of water that has flowed through the water filter, wherein the filter is in fluid communication with the flow restrictor for limitation of a water flow to a maximum amount of water that flows in a given period of time through the water filter.

In known water devices a flow totalization unit is frequently applied, e.g. to predict the end-of-life of a water filter or the amount of water that has been conditioned, e.g. discharged, heated or cooled by the device. In such known water treatment devices water usually drives a water turbine while flowing through the device. The turbine drives a number of gears and finally means for cutting off the flow after a predetermined maximum amount of water is processed by the water treatment device and e.g. by a water filter accommodated in the device. When the flow of the water through such a water treatment device is below a certain level, or—using the foregoing nomenclature—below a leakage limit, the rotation of the turbine may not correspond to the amount of water that is flowing through the appliance and that is being processed by e.g. the filter. In such a situation it can even occur that a limited water flow is maintained along the turbine, not causing any rotation of the turbine or any registration by the flow totalization unit, for example in a situation where water is leaking through a faucet. When this situation continues or happens many times, e.g. when the system is frequently switched on and off to filter small amounts of water, the flow will not be cut off even if a period for safe and effective use of the filter has expired. Known water devices frequently include a flow limiter. Limitation of the flow ensures a safe working of the device, such as for example in case of filtration, where the flow limiter ensures that the water remains in the filter for a period of time which is sufficient to guarantee an effective purification of the water while at the same time the filter is protected against 'blowing through' damage caused by an excessive water flow. As described above, the water flow through the appliance causes a pressure drop over the flow limiter. The difference between the pressure in the inlet of the limiter and the pressure in the outlet of the limiter is dependent on the water flow, i.e. the amount of water that flows through the restrictor in a given period of time. Said pressure difference will increase at increasing water flow through the flow limiter and will decrease or even disappear when the flow through the limiter is decreased or stopped, respectively. Below a critical minimal flow, the amount of water flowing through the filter can only inaccurately be detected by the turbine of the totalization unit because water substantially circumvents the turbine below said critical flow without causing the turbine to drive the gears of the totalization unit. This critical minimal flow corresponds to a critical minimum pressure difference or critical minimum pressure drop over the flow limiter. Below the critical minimum pressure drop the totalization unit does not register properly the flow. The critical minimum pressure drop depends on the sensitivity of the totalization unit. Characteristics of the flow totalization unit, such as the shape of the turbine, number of gears and friction in the transmission between the gears determine the sensitivity and the critical minimum pressure difference below which no accurate registration is possible. By matching of the predetermined pressure difference between an inlet and an outlet of the flow limiter to the critical minimum pressure drop over the flow limiter, the flow control unit, by means of the leakage stop, will cut off the flow when the flow tends to go below the critical minimum flow. Small water flows are avoided. Accuracy of the totalization unit is preserved. The end-of-life of the filter can be reliably predicted. In water filter devices end-of-life indication of the filter is frequently provided by a valve which stops flow after a predetermined volume has been filtered. Although flow totalization and shutoff mechanisms may be relatively expensive and complex, they have become recognized as the most accurate means of indicating end of life, in spite of their expensiveness and complexity. Especially while processing a low water flow, i.e. a limited amount of water flowing through the appliance in a given period of time, an accurate measurement of the processed amount of water remains difficult. Such an inaccurate measurement decreases the reliability in the end-of-life prediction for the filter cartridge. By avoidance of small flow the present invention provides improved accuracy in registration of the total amount of water that has flown through the appliance. A reduction of the cost and complexity of flow totalization and shutoff mechanism is achievable by a using the leakage stop also as the valve which stops flow after a predetermined volume has been filtered or as the means for cutting off the flow after a predetermined amount of water is processed. A reduction of the cost and complexity is also achievable because the flow restrictor is used for limitation of the water flow.

In a preferred embodiment according to the invention the appliance has a reservoir for storage of a filtered amount of water, wherein the water flow control unit has a level controller for maintaining a predetermined water level in said reservoir, which level controller comprises the leakage stop.

Most filtering systems need considerable time to guarantee a proper purification of the water. It is considered convenient that within an acceptable period several portions of drinking water can be tapped from the appliance. For this reason, the appliance is provided with a reservoir where an appropriate volume of filtered water can be stored. When there is no water demand the water level in the reservoir should be restored to reach a maximum level. When the maximum level is reached, i.e. when the reservoir is completely filled, the level controller cuts off the water flow and prevents that the reservoir is filled in excess of the maximum level. If filtered water is tapped from the reservoir the level of the water in the reservoir will drop below the maximum level. The level controller included in the fluid control unit or the water flow control unit will now opened in response to the level being low to allow inflow of freshly filtered water into the reservoir. Hence, opening and closure is involved in the control of the water level in the reservoir. It is advantageous to involve the leakage stop in the control of the water level and—as the leakage stop is present in the water flow control unit—no separate device for opening and closure is needed. Several ways for level control are available, such as detection of the water level by a sensor and feedback of a sensor signal to the water flow control unit. The sensor may be an optical, capacitive or inductive device. Alternatively, mechanical means can be advantageously applied for level control as will be described here below.

In a preferred embodiment the level controller comprises a movable element, whose position is responsive to the level of the water in the water reservoir and a lever, which lever is pivotably mounted around a position which is fixed relative to the reservoir, one end of the lever being secured to the movable element, wherein the leakage stop is engageable by the lever.

Such an arrangement is known to be very reliable, easy to manufacture and at relatively low costs.

The filter assembly for a water appliance according to the invention has a filter, a flow restrictor and a leakage stop in serial fluid communication with the flow restrictor, for cutting-off a water flow through the filter below a predetermined value of a pressure difference between an inlet and an outlet of the flow restrictor.

BRIEF DESCRIPTION OF THE DRAWINGS

These and other aspects of the water appliance and the filter assembly of the invention will be further elucidated and described with reference to the drawings, in which.

DETAILED EMBODIMENTS

Figure 1A:
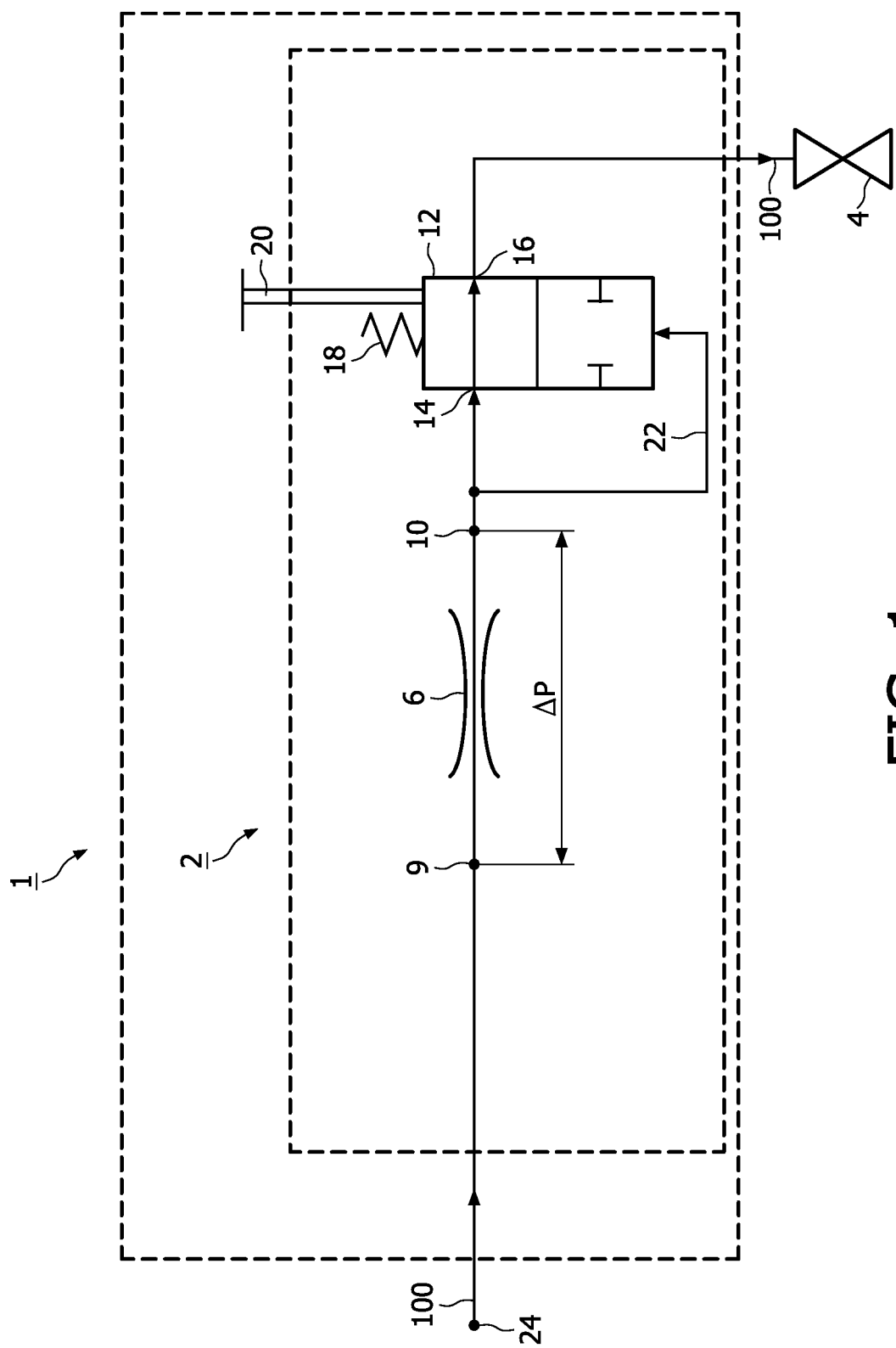
FIGS. 1a-1c are schematic representations of embodiments according to the invention.

In the following figures like reference numerals indicate like or similar components.

Figure 1B:
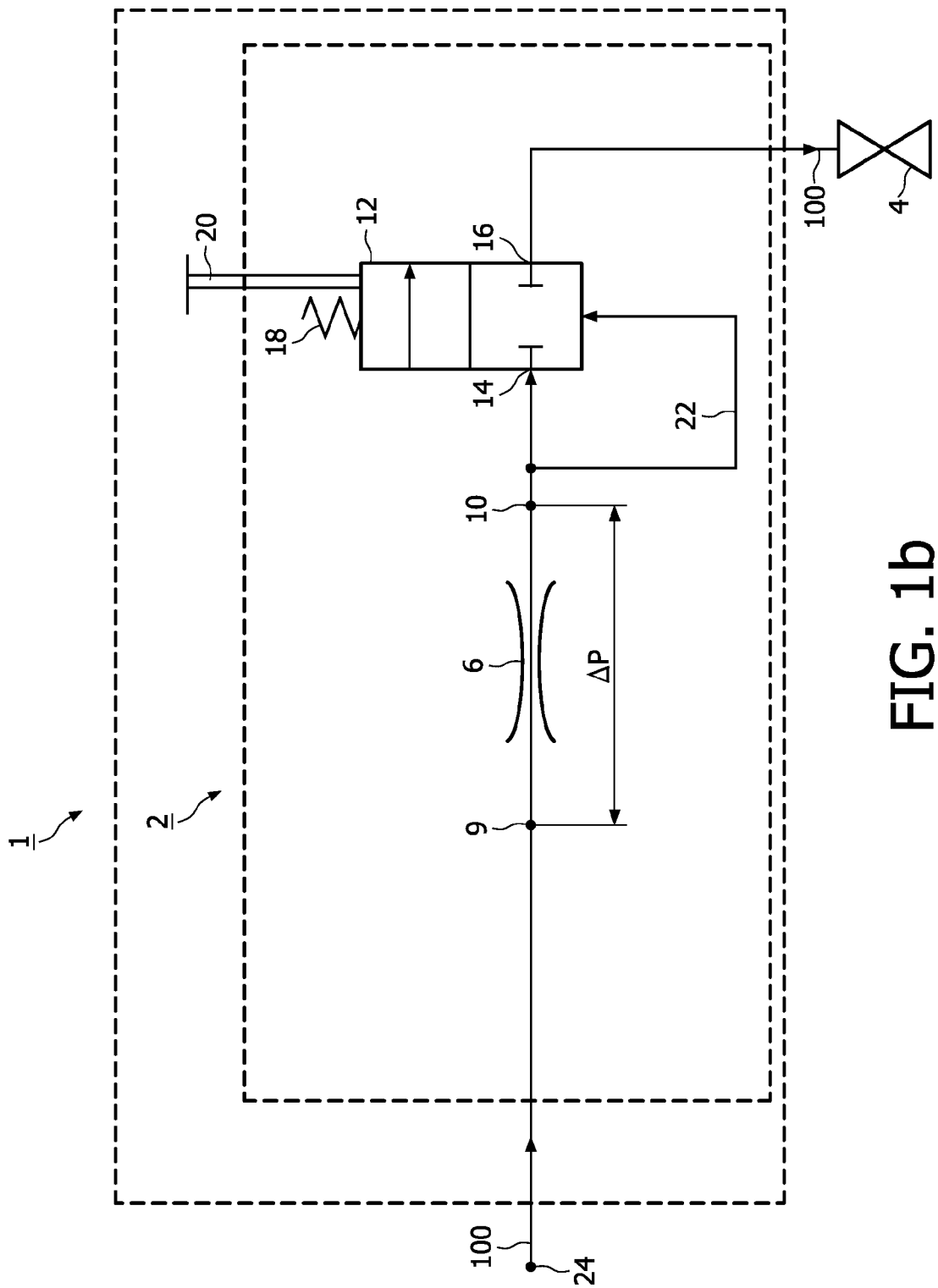

In FIGS. 1a and 1b a water appliance 1 is schematically depicted by a first striped box. The water appliance 1 has a flow control unit 2 indicated by a second striped box inside the first striped box. A faucet 4 can be opened to enable a water flow 100 through the appliance 1. The water flow 100 is controlled by the flow control unit 2. The flow control unit 2 includes a flow restrictor 6. During normal demand of water the flow 100 through the appliance 1 and through the flow restrictor 6 will cause a drop of pressure ΔP between an inlet 9 of the restrictor 6 and an outlet 10 of the restrictor 6. The flow control unit 2 has a leakage stop 12. The leakage stop 12 is linked into the flow control unit via two connections 14 and 16. The leakage stop 12 has two switch positions. A first switch position is depicted in FIG. 1a. In the first switch position a fluid connection is established between the two connections 14 and 16 such that the water flow 100 can flow through the leakage stop 12. A second switch position is depicted in FIG. 1b. In the second switch position as depicted in FIG. 1b the passage from connection 14 to 16 is blocked and no water can flow through the leakage stop 12. The leakage stop 12 of FIGS. 1a and 1b is indicated by a hydraulic symbol generally known as a hydraulic 2/2 valve. The two switching positions can be effectuated under a combined action on the leakage stop 12. The combined action arises from a hand-operated button 20, from hydraulic pressure at the outlet 10 of the restrictor 6 via a fluid command line 22 and from mechanical action via a resilient element 18.

The operation of the leakage stop is explained here below. In the first switching position (FIG. 1a) the magnitude of the pressure drop ΔP over the flow restrictor 6 is dependent on the water flow 100. The pressure drop ΔP increases at an increasing flow 100 and decreases if the water flow 100 reduces. Several situations can arise in which the water flow 100 will reach a magnitude which corresponds to a leakage flow. This can for example be the case if the user closes the faucet 4 in the absence of further demand for water or if the faucet 4 is almost but not completely closed or in a situation where unintentionally a small amount of water is leaking through the water appliance 1. A value for the water flow 100 can be pre-determined below which pre-determined value of the water flow it can be assumed that there is no demand for water which is actually intended by the user. Such a low water flow below said predetermined and minimal flow indicates leakage of water and said predetermined and minimal flow of water will be referred to as the leakage limit of the flow.

The leakage limit corresponds to the predetermined value of a pressure difference ΔP between the inlet 9 and the outlet 10 of the flow restrictor 6 of the control unit 2. When the flow 100 through the restrictor 6 decreases and reaches the leakage limit, the predetermined value of the pressure difference ΔP over the restrictor 6 is established. As the flow reduces the hydraulic pressure at outlet 10 will approach the hydraulic pressure at the inlet 9. Hence the hydraulic pressure at outlet 10 will rise.

The inlet 9 is in fluid communication to a water supply system 24, such as a public water system or a pressurized water storage system. As the flow decreases the hydraulic pressure in the outlet 10 will approach the hydraulic pressure in the inlet 9. Hence, occurrence of the leakage limit will correspond to a pressure rise in the outlet 10 of the restrictor 6. Said pressure rise is communicated via fluid command line 22 and tends to move the 2/2 valve to switch to a closed position against the action of a spring 18. Upon closure the 2/2/valve switches to the position as depicted in FIG. 1b.

In FIG. 1b the water flow 100 through the appliance 1 and the control unit 2 is interrupted by the 2/2 valve or leakage stop 12. If the faucet valve 4 is opened by a user who has a demand for water, the leakage stop 12 will remain closed, because there is no interaction between the faucet 4 and the leakage stop 12. To open the leakage stop 12 the user has to operate the button 20 by hand to bring the leakage stop 12 in the configuration of FIG. 1a, wherein a fluid connection is established again between the two connections 14 and 16 so that the water can flow through the leakage stop 12. Once the water flow 100 is re-established by the user the pressure at the outlet 10 drops. The pressure drop is communicated via fluid command line 22 and tends to keep the 2/2 valve or leakage stop 12 in an open position supported by the action of spring 18.

Figure 1C:
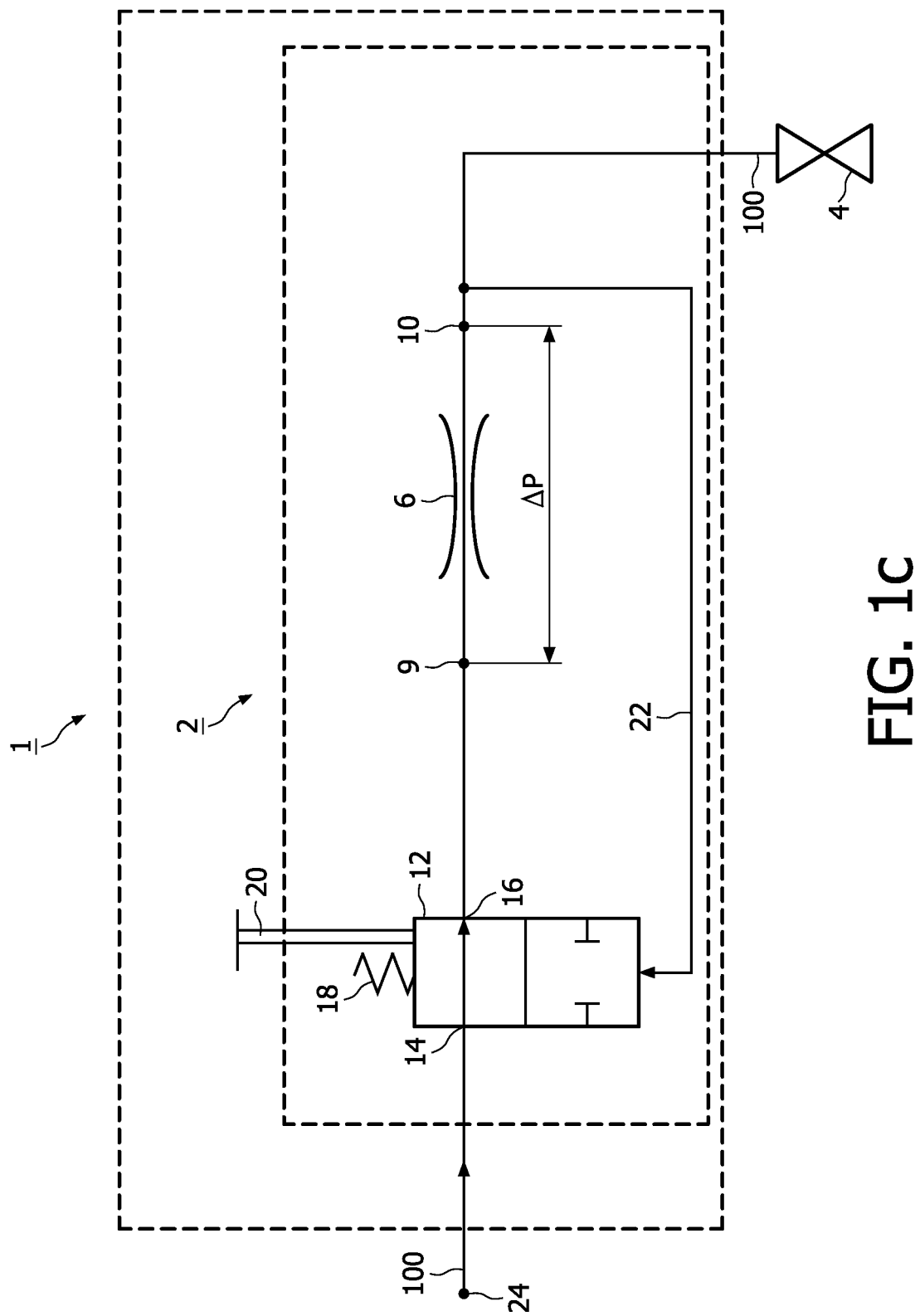

In the embodiment as depicted in FIGS. 1a and 1b the water flow first runs through the restrictor 6 and subsequently through the leakage stop 12 and finally through the faucet 4. It is also possible that the restrictor 6 is arranged between the leakage stop 12 and the faucet 4 as depicted in FIG. 1c. Alternatively, the faucet can be arranged such that the water flow first runs through the faucet and subsequently though the other components as will be appreciated by the skilled person.

Figure 2A:
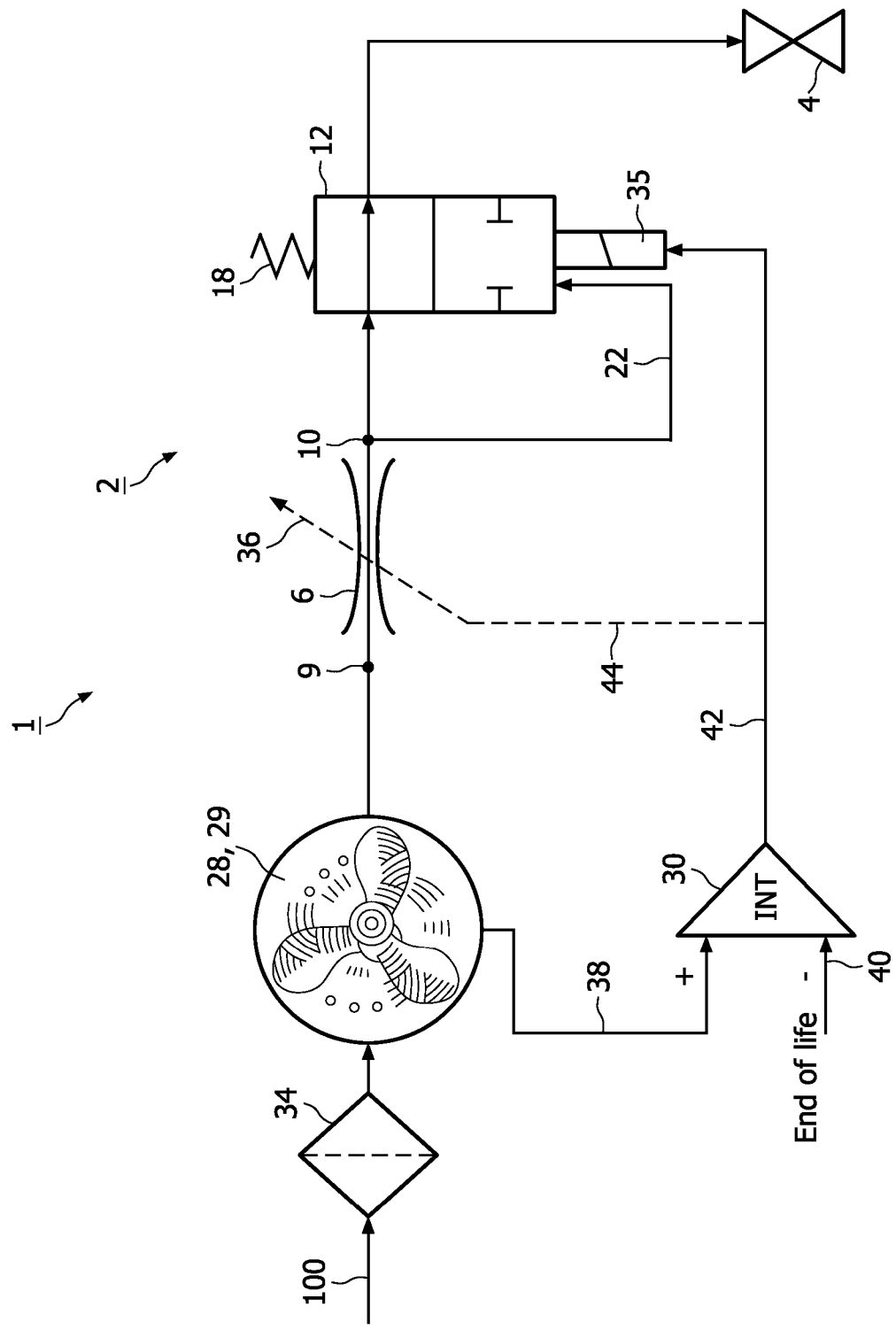
FIGS. 2a-2b are schematic representations of embodiments of water appliances according to the invention.

In FIG. 2a a water appliance 1 and part of a flow control unit 2 are schematically indicated. A filter 34 is provided for filtering a water flow 100. The filter 34 is serially arranged with a sensor 28. The water flow 100 drives a water turbine 29 of the sensor 28 while flowing through the water appliance 1. The revolutions of the turbine are communicated by mechanical or electrical or hydraulic signals 38 to an integrator 30. Integrator 30 integrates signal 38. The integrated signal 30 corresponds with the amount of water that has flown through the filter 34. Integrator 30 compares the integrated value of signal 38 with a predetermined value 40. The predetermined value 40 corresponds to the end-of-life of the filter 34. In case the integrated value of signal 38 exceeds the predetermined value 40, integrator 30 outputs a signal 42 for cutting off the flow by a leakage stop 12. Leakage stop is operated similarly as described according to FIGS. 1a-1c and has two switching positions. In the embodiment of FIG. 2 the leakage stop 12 is indicated in its open position, i.e. allowing a water flow 100.

When, at the end-of-life of the filter 34, the integrator 30 generates signal 42, a solenoid 35 is activated. The solenoid 35 acts on the leakage stop 12 by pushing the leakage stop 12 in a position which disables the water flow 100.

Alternatively, the signal 42, 44 can be used to act on a variable restrictor 36. The variable restrictor 36 has an inlet 9 and an outlet 10. By decreasing the resistance of the restriction of restrictor 36, the hydraulic pressure at outlet 10 will increase. This pressure rise at outlet 10 is communicated via a fluid command line 22 to the leakage stop 12 and tends to move the 2/2 valve 12 to switch to a closed position against the action of a spring 18. This alternative is indicated by the striped lines in FIG. 2a.

In the embodiment as depicted in FIG. 2a the leakage stop is advantageously used to close off the water flow 100 when the end-of-life of the filter 34 is reached without using a separate and extra component for closing off the flow at the end-of-life of the filter 34.

Figure 2B:
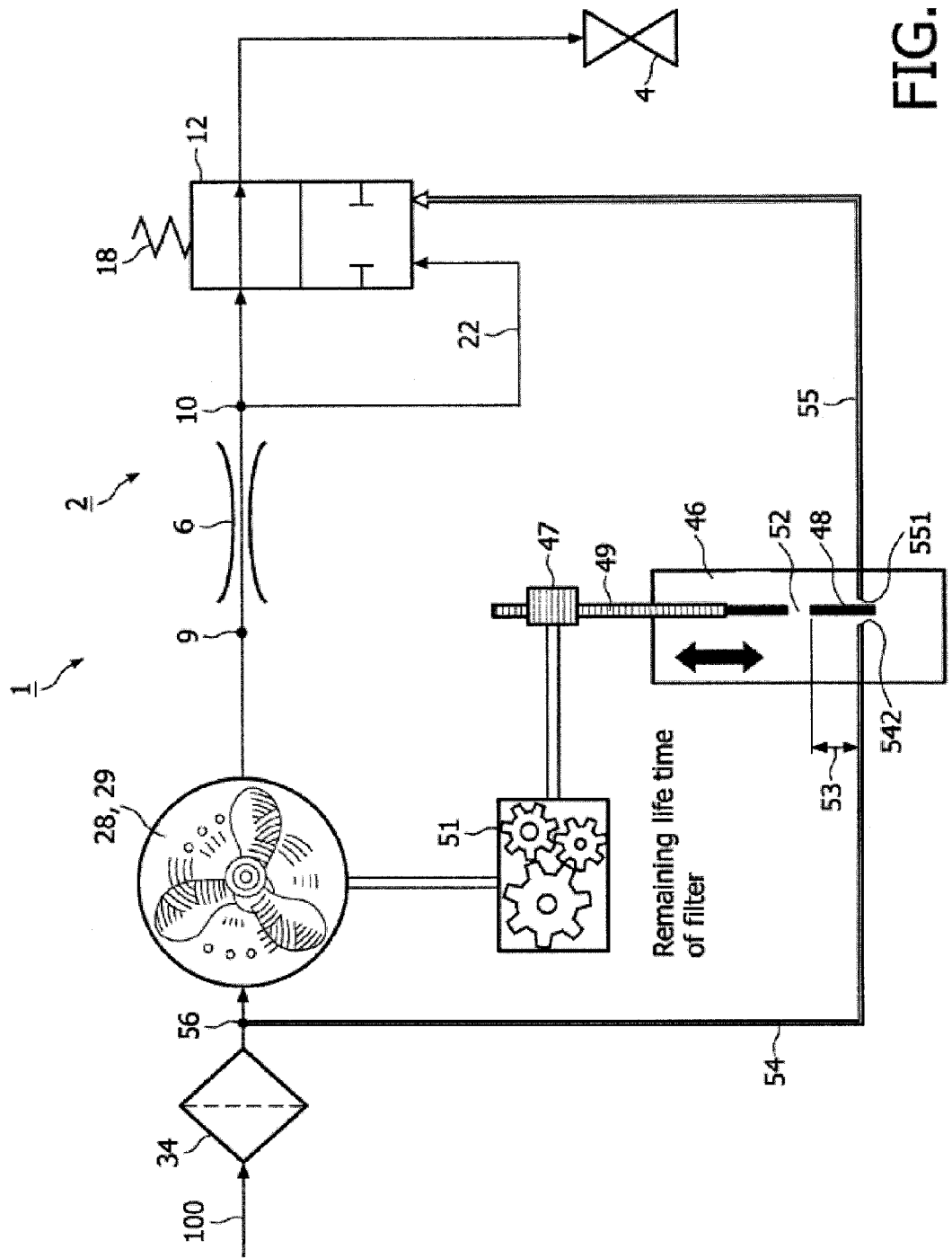

A very cost-effective solution is obtained if the turbine 29 drives a gate 46, possibly via a sub-drive of a gearbox 51 (FIG. 2b). Gearbox 51 transforms a number of revolutions of propeller 29 of sensor 28 into a desired number of revolutions of a pinion 47. Pinion 47 acts on a rack 49. The gate 46 has a valve 48 which is driveably connected to the rack 49. At an increasing number of revolutions of turbine 29, i.e. at an increasing amount of water filtered by filter 34, valve 48 shifts down under the action of water flowing through sensor 28, which action is transmitted via gearbox 51 and rack 49 and pinion 47 to translating valve 48.

A conduit 54 is in fluid communication with an outlet 56 of filter 34. Outlet 56 is at a hydraulic pressure which exceeds the hydraulic pressure at inlet 9 and outlet 10 of restrictor 6. A conduit 55 is attached as a command line—similar to command line 22 in FIG. 2a—to the leakage stop 12. Hence, if the hydraulic pressure of outlet 56 is communicated to conduit 55, i.e. if fluid passage is possible from a conduit 54 to conduit 55, the pressure at outlet 56 will be communicated to conduit 55 and leakage stop 12. The 2/2 valve 12 will switch to a closed position against the action of a spring 18.

In the situation as depicted in FIG. 2b valve 48 blocks the fluid passage from conduit 54 to conduit 55. Hence, filtered water can still be drained from faucet 4. Valve 48 keeps blocking the passage from conduit 54 to 55 until an opening 52 in valve 48 is positioned between an outlet 542 of conduit 54 and an inlet 551 of conduit 55. Double headed arrow 53 indicates the distance which can still be traveled by valve 48 until opening 52 is positioned between outlet 542 and inlet 551. The distance 53 corresponds to the remaining life time of filter 34. Once the opening 52 enables fluid passage from conduit 54 to conduit 55 fluid communication between outlet 56 of filter 34 and leakage stop 12 is possible. Conduits 54 and 55 now act similar as fluid command line 22. The hydraulic pressure at outlet 56 is communicated to the leakage stop 12 and tends to move the 2/2 valve 12 to switch to a closed position against the action of a spring 18. This situation will maintain until the filter 34 is replaced and the gate 46 is reset.

Figure 3:
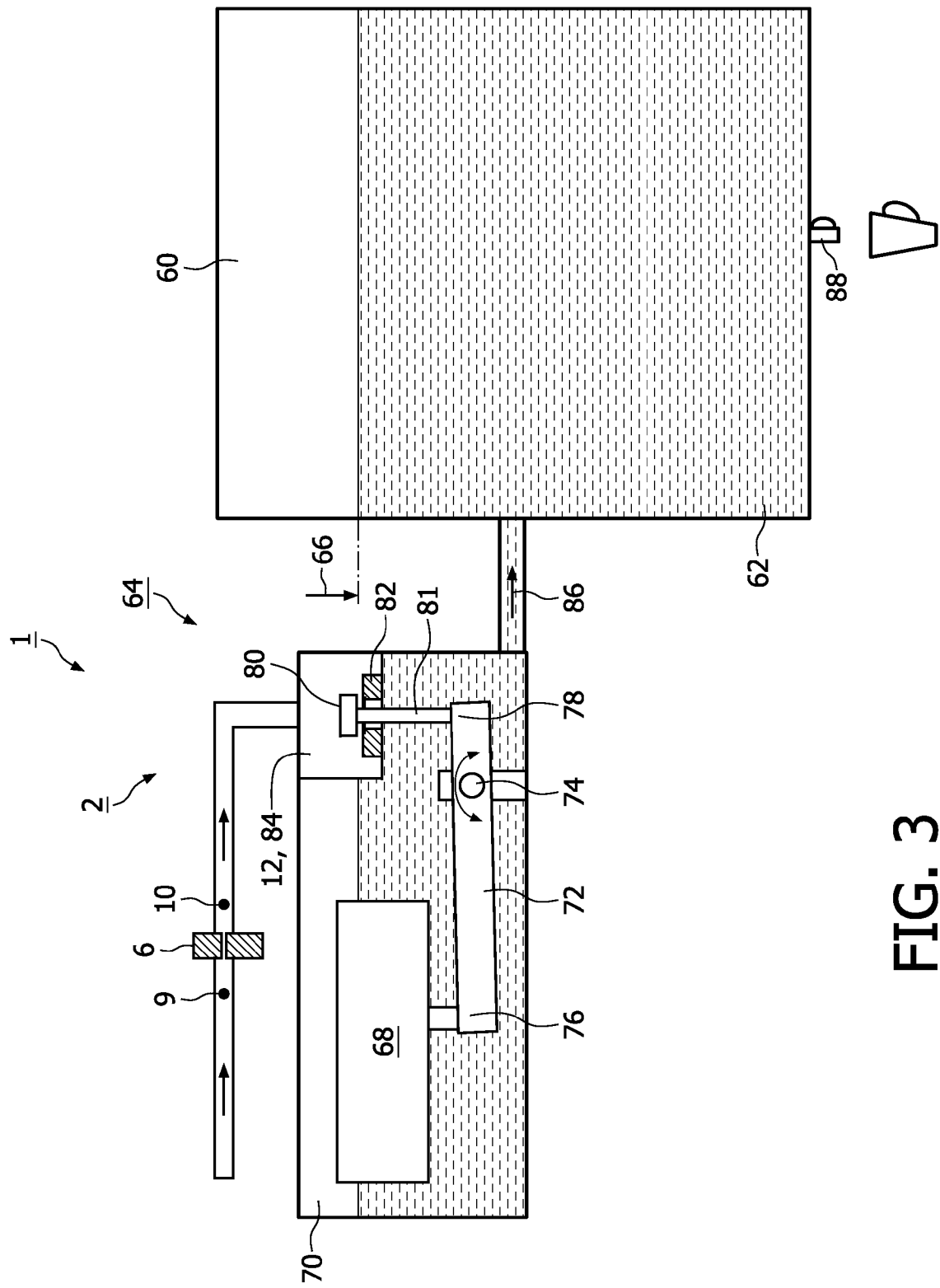
FIG. 3 is a schematic representation of an embodiment of a flow control unit according to the invention.

In FIG. 3 a water appliance 1 is depicted which has a reservoir 60 for storage of an amount of water 62. A level controller 64 secures that a desired or predetermined water level 66 is maintained in the water reservoir 60. The level controller 64 has a float 68 which position is responsive to the water level 66 in the reservoir 60. The float 68 is accommodated in a float chamber 70 which is in fluid communication with the reservoir 60. The float 68 is mounted to a lever 72 which can pivot around a point 74 which is fixed relative to the reservoir 60. The float 68 acts on one end 76 of the lever 72. Another end 78 of the lever 72 is secured to a valve body 80 of a leakage stop 12. The valve body 80 and a valve seat 82 are accommodated at the bottom of a valve chamber 84. The valve body 80 can cooperate with the valve seat 82 to seal the passage of water from the valve chamber 84 to a float chamber 70 and the reservoir 60. Closure of the valve body 80 against the valve seat 82 depends among others on the position of the float 68. The float chamber 70 communicates with the reservoir 60 via a duct 86.

Water can be drained from the reservoir 60 via a spout or faucet 88. The level 66 of the water in reservoir 60 will decrease. As the reservoir 60 is in fluid communication with float chamber 70, the water level in the float chamber 70 equals the water level 66 in the reservoir 60. The float 68 is responsive to the water level and the position of the float 68 changes. The float 68 acts on lever 72 which rotates counter clockwise when the water level in the float chamber 70 decreases. The lever 72 rotates around point 74. Hence the valve body 80 is pushed upwards as the lever 68 goes down when the water level decreases. As valve seat 82 is fixed in the valve chamber 84 a passage is formed between valve body 80 and valve seat 82. The valve body 80 being lifted from its valve seat 82, water can flow from the valve chamber 84 into the float chamber and from the float chamber 70 to the reservoir 60 via duct 86. The valve chamber 84 is supplied with water via restrictor 6.

As the level increases, the float 68 will be pushed upwards by the raising water in the float chamber 70. At the same time the valve body 80 moves down by the action of lever 72 until valve body 80 seals against the valve seat 82. The level in the reservoir 60 is now restored. The valve body 80 has an elongated portion 81 which is engageable by the lever, and a sealing portion for fluid-sealing cooperation with the valve seat, wherein the valve seat has an opening for guiding through the elongated portion.

Figure 4A:
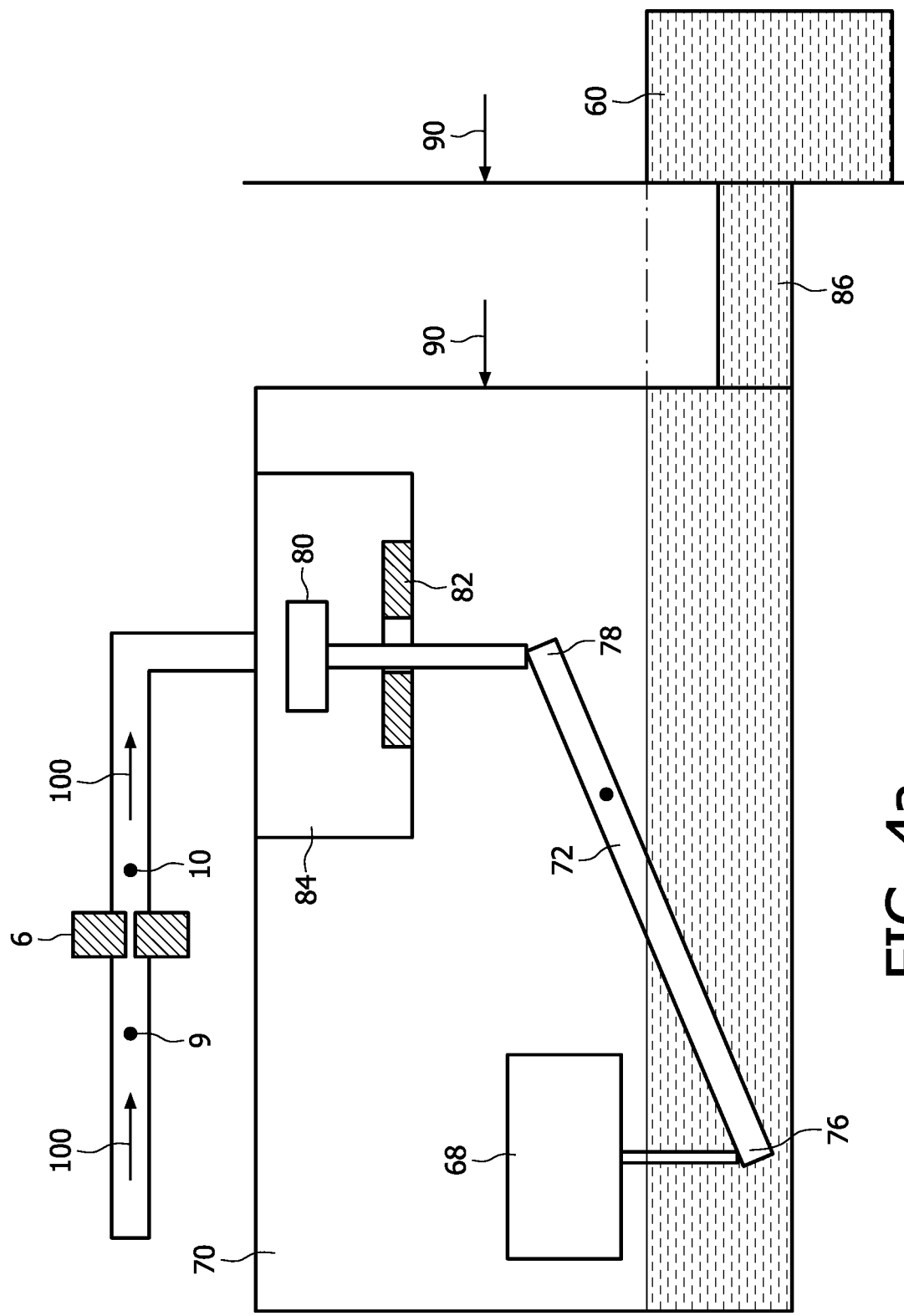
FIGS. 4a-4c are schematic representations of an embodiment of a leakage stop according to the invention.
Figure 4B:
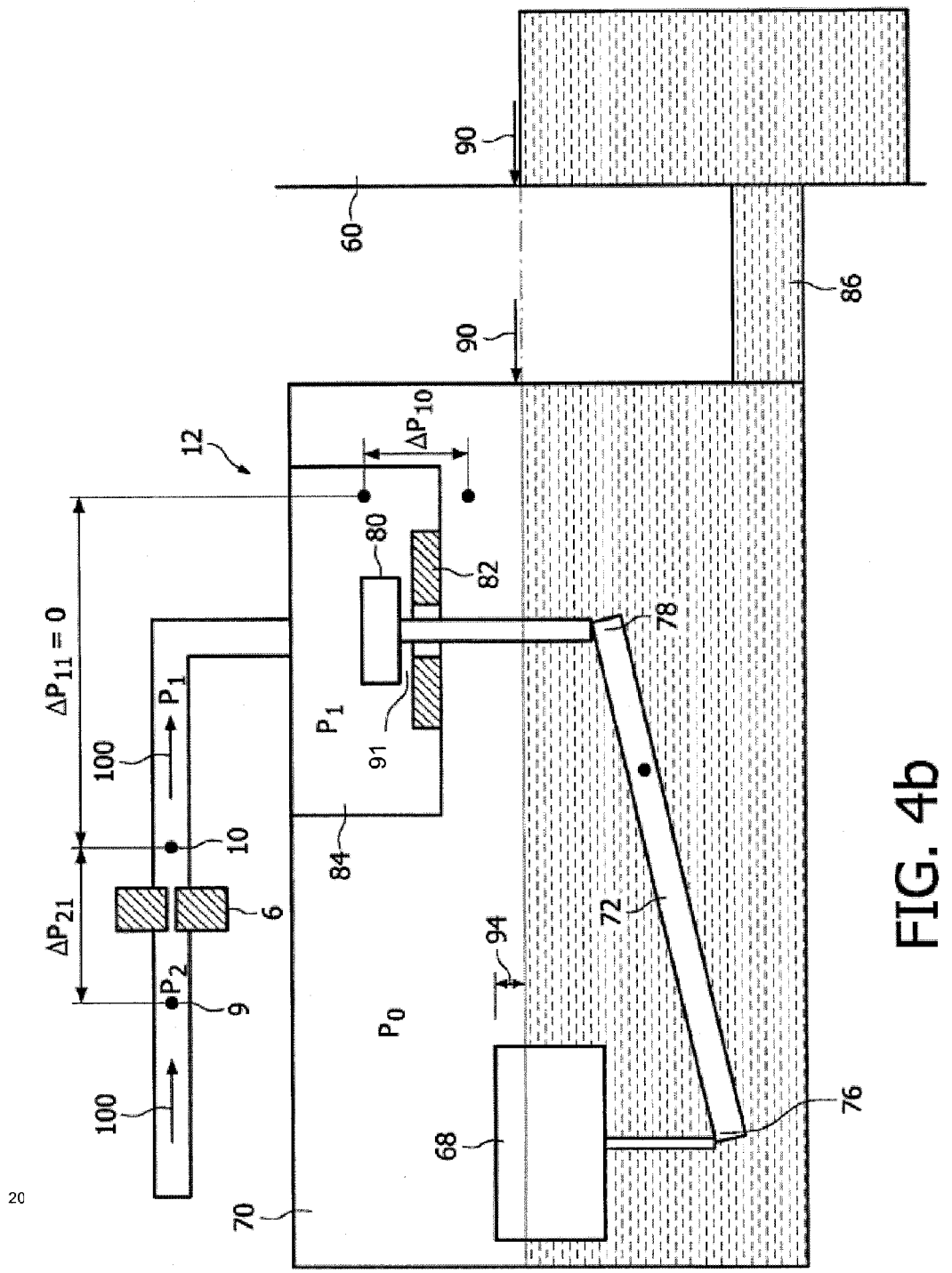
Figure 4C:
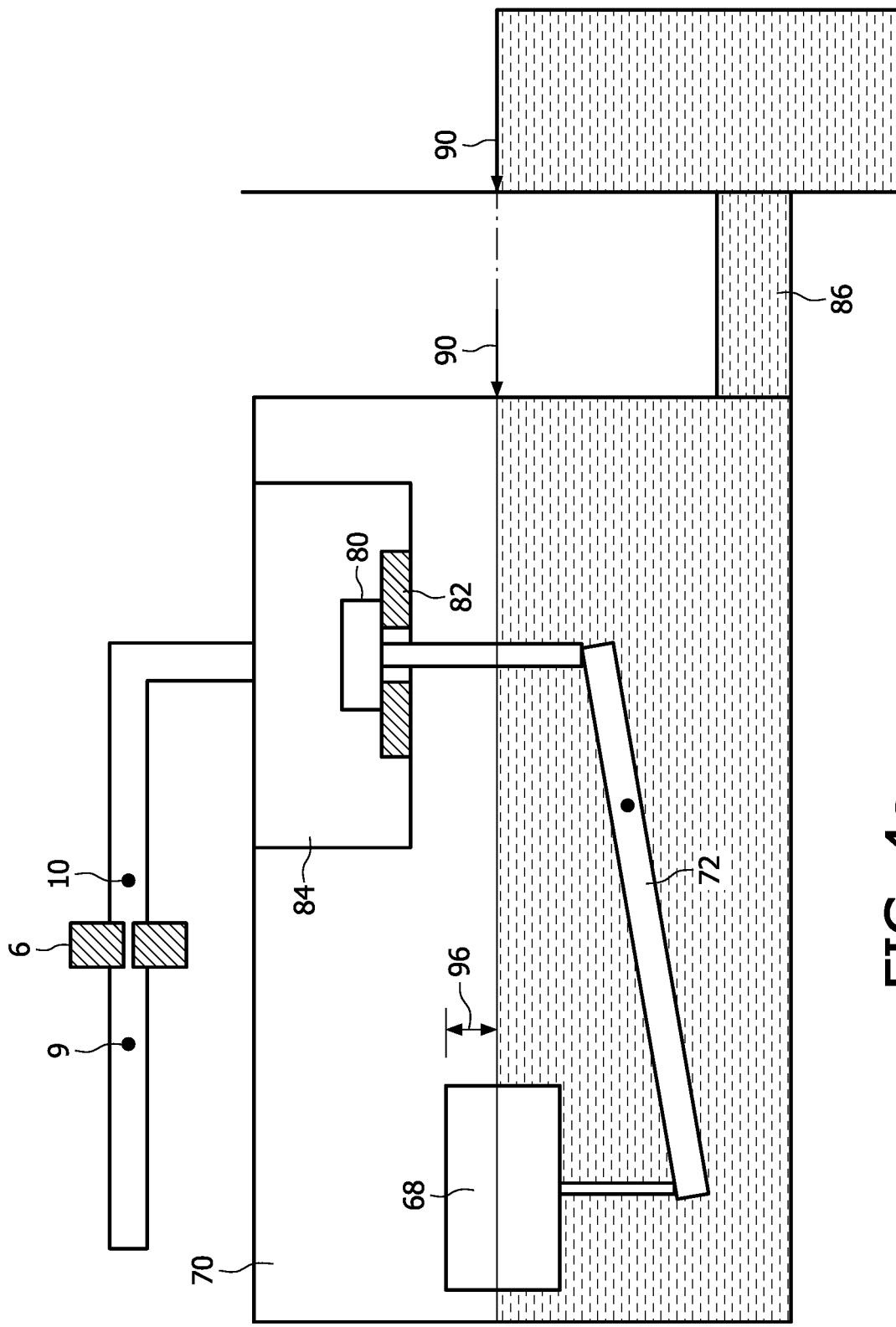

A portion of the water appliance of FIG. 3 is indicated in FIGS. 4a to 4c in three different situations. In the situation as depicted in FIG. 4a the water in the float chamber 70 and in the reservoir 60 is considerably below a desired level 90. The flow restrictor limits the flow 100 to a specified flow which for example prevents that the filter (not shown) is damaged. The pressure at inlet 9 of flow restrictor 9 exceeds the pressure at outlet 10 of flow restrictor 10, i.e. the pressure at outlet 10 is relatively low compared to the pressure at inlet 9. Valve chamber 84 is in fluid communication with outlet 10 and the relatively low hydraulic pressure at outlet 10 is transmitted to hydraulic chamber 84. On the one hand, the low hydraulic pressure in chamber 84 acts on valve body 80 and tends to push valve body 80 down against valve seat 82. On the other hand float 68 is acting on end 76 of lever 72. As the water level in float chamber 70 is low, no buoyancy force acts on float 68. Hence the weight of float 658 is transmitted via end 76 of lever 72 to end 78 and tends to pushes valve body 80 upwards away from its valve seat 82. In the situation as depicted in FIG. 4a water passage from valve chamber 84 to float chamber 70 is enabled and the water level in the float chamber 70 will rise. Via duct 86 the water will be supplied to reservoir 60 from float chamber 70.

In the situation of FIG. 4b the water in the float chamber 70 is almost at its desired level 90. The flow restrictor is still flown through by a water flow 100 however in a moderate quantity. The valve body 80 is close to the valve seat 82 under the action of the raising water and the float mechanism comprising the float 68 and the lever 72. A narrow gap 91 will enable water to flow from the valve chamber 84 to the float chamber 70. The gap 91 establishes a restriction to the water flow from the valve chamber 84 to the float chamber 70. Due to the flow restriction generated by gap 91 a pressure drop $\Delta P_{10}$ will arise across valve body 80 which tends to push down valve body 80 and to push up float 68 out of the water over a distance 94. At the same time the pressure drop across flow restrictor 6 will decrease because the total pressure drop between the inlet 9 of restrictor 6 and float chamber 70 is distributed over the flow restrictor 9 ($\Delta P_{21}$) and the gap 91 ($\Delta P_{10}$). Hence the pressure in the valve chamber 84 will rise and the pressure drop $\Delta P_{10}$ over the gap 91 will increase. This has the effect that the force equilibrium over the lever 72 is disturbed and that the valve body 80 is pressed against its valve seat 82 in an accelerated manner. The arrangement of the valve body 80 and the valve seat 82 in valve chamber 84 in serial fluid communication with outlet 10 of the flow restrictor 6 thus constitutes a leakage stop 12 according to the invention. Below a predetermined value of a pressure difference $\Delta P_{21}$ between the inlet 9 and the outlet 10 of flow restrictor 6, the pressure difference $\Delta P_{10}$ across the valve body 80 increases rapidly, the valve body is pushed in a sealing engagement with the valve seat 82 and the flow is cut off.

In FIG. 4c shows that the valve body 80 and the valve seat 82 close the fluid passage from valve chamber 84 to float chamber 70. The pressure at inlet 9 is transmitted through the restrictor 6 to outlet 10 and valve chamber 84. The float 68 is pushed out of the water over a distance 96. Distance 96 exceeds distance 94 (FIG. 4c) because in the situation as depicted in FIG. 4c the entire pressure difference $\Delta P_{21}+\Delta P_{10}$ is across the valve body 80, while the level of the water has hardly changed from the situation in FIG. 4b to the situation in FIG. 4c.

Figure 5:
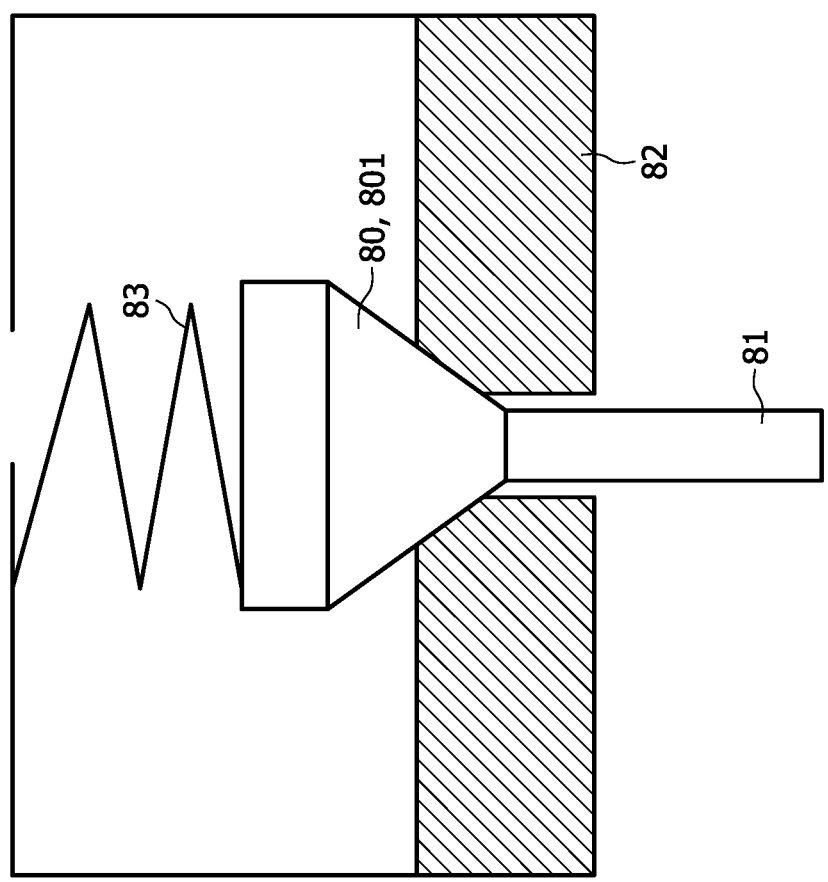
FIG. 5 is a schematic representation of an embodiment of a valve body and a valve seat according to the invention.

In FIG. 5 an embodiment of a valve body 80 and a valve seat 82 are depicted. The valve body 80 has a tapered portion 801 which cooperates with a corresponding surface of the valve seat 82. Tapering the body 80 and the seat 82 increases the sealing surface between the body and the valve. The increased sealing surface makes the seal more sensitive to particles which may be present in the water, e.g. after replacement of a filter. To ensure complete closure of the body 80 against seat 82 it is advantageous if seat 82 is of a resilient material such as rubber and if body 80 is pressed against its seat 82, for example by a spring 83.

Figure 6:
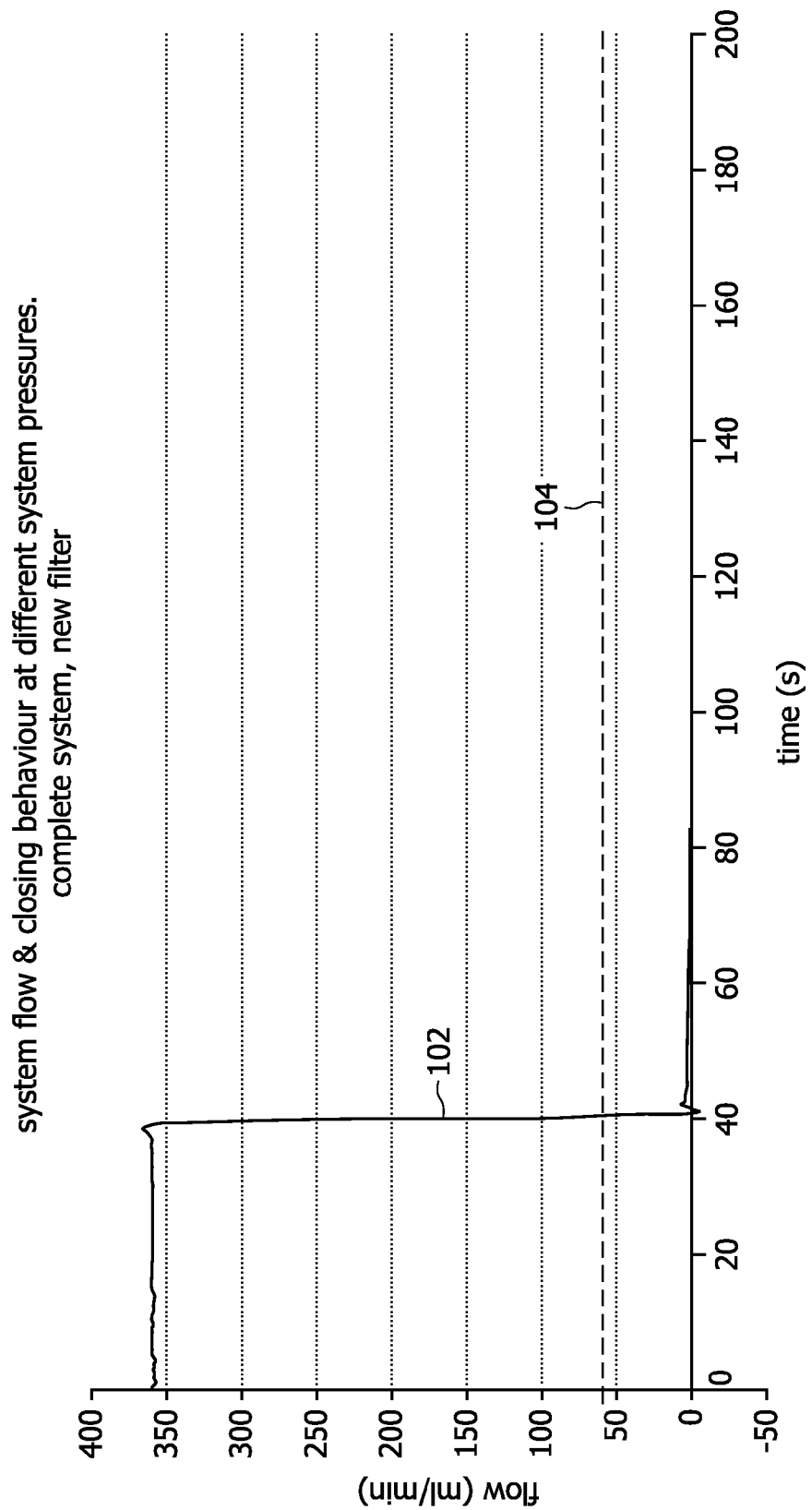
FIG. 6 is a graph showing water flow as a function of time.
Figure 7:
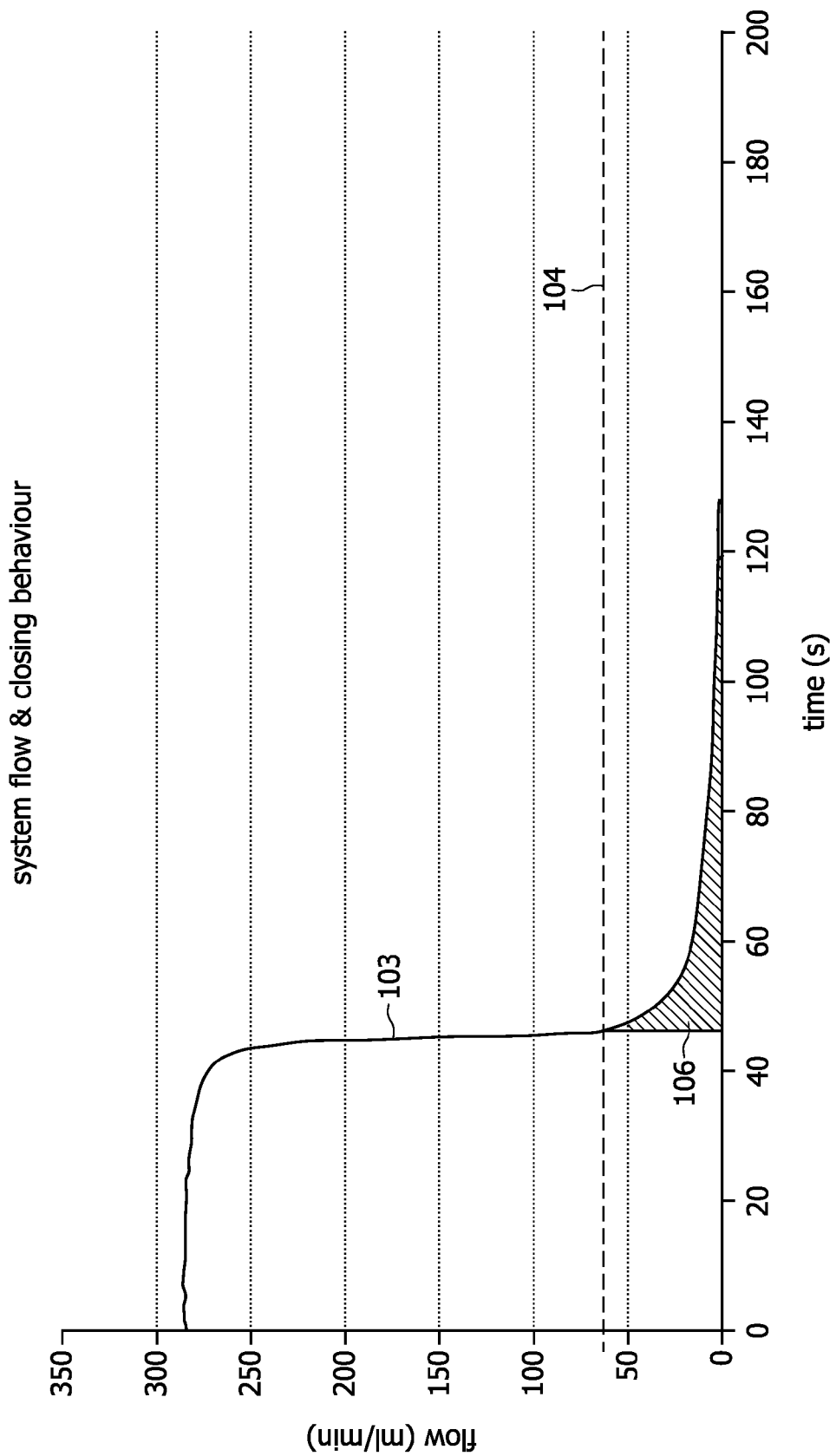
FIG. 7 is a graph showing water flow as a function of time.

FIG. 6 shows the flow in ml/min as a function of time through a water filter appliance according to the invention (solid curve 102). At the bottom of the graph a dashed straight line 104 indicates a minimal registration limit of the flow control unit. A flow which has a value below this limit 104 is not recorded by the flow totalization unit and will cause that the filter will be used during a period which exceeds the safe life time of the filter. The cutting off behaviour is relatively steep as can be concluded when the graph of FIG. 6 is compared to the graph of FIG. 7. In FIG. 7 the flow in ml/min as a function of time through a water filter appliance which the leakage stop according to the invention, is indicated (solid curve 103). The flow changes relatively slowly as can be concluded by comparison with curve 102 of FIG. 6. Below limit 104 the flow totalization will not record a considerable amount of water which is indicated by the hatched area 106. Frequent opening and closure will cause that a considerable amount of water is filtered by the filter in excess of its safe life time. As can be seen from inspection of FIG. 6, this undetected amount of water is very limited in case water appliance is according to the invention.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein the order of valves and fluid restrictions are exchanged or wherein command lines are connected at different inlets or outlets of the filter or the restrictor. Control of valves or components can be implented by electrical, hydraulical as well as mechanical means. Such other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A water appliance comprising: a water flow control unit for controlling a water flow, the control unit including a flow restrictor, and a leakage stop in serial fluid communication with the flow restrictor, with the leakage stop including at least two positions, with a first one of the two positions configured to allow water flow through the leakage stop and a second one of the two positions configured to cut-off the flow when a pressure difference between an inlet and an outlet of the flow restrictor indicates a leakage limit of the flow by being below a predetermined value; a water filter; and a flow totalization unit configured to add up a volume of water that has flowed through the water filter, wherein the water filter is in fluid communication with the flow restrictor for limitation of the water flow to a maximum amount of water that flows in a given period of time through the water filter, the flow totalization unit has a minimal flow below which the flow totalization unit will not add up a volume of water that has flowed through the water filter and the minimal flow is the leakage limit.

2. The water appliance according to claim 1, comprising a reservoir for storage of an amount of water, wherein the water flow control unit has a level controller configured to maintain a predetermined water level in said reservoir, which level controller comprises the leakage stop.

3. The water appliance according to claim 2, wherein the level controller comprises a movable element, whose position is responsive to the level of the water in the water reservoir and a lever, which lever is pivotably mounted around a position which is fixed relative to the reservoir, one end of the lever being secured to the movable element, wherein the leakage stop is engageable by the lever.

4. The water appliance according to claim 3, wherein the leakage stop comprises a valve body and a corresponding valve seat for cutting-off the water flow, wherein the valve body or the valve seat is engageable by the lever.

5. The water appliance according to claim 4, wherein the valve body comprises an elongated portion which is engageable by the lever, and a sealing portion for fluid-sealing cooperation with the valve seat, wherein the valve seat has an opening for guiding through the elongated portion.

6. The water appliance according to claim 5, wherein the sealing portion has a tapered part for cooperation with a sealing face of the valve seat.

7. The water appliance according to claim 1, wherein the leakage stop is in fluid communication with the flow totalization unit for cutting of the flow after filtrating of a predetermined quantity of water by the water filter.

8. A filter assembly for a water appliance having a filter, the filter assembly comprising a flow restrictor; a leakage stop in serial fluid communication with the flow restrictor, with the leakage stop including at least two positions, with a first one of the two positions configured to allow water flow through the leakage stop and a second one of the two positions configured to cut-off the water flow through the filter when a pressure difference between an inlet and an outlet of the flow restrictor indicates a leakage limit of the flow by being below a predetermined value; and a flow totalization unit configured to add up a volume of water that has flowed through the filter and having a minimal flow below which the flow totalization unit will not add up a volume of water that has flowed through the filter and the minimal flow is the leakage limit.

9. A water appliance comprising:
a flow restrictor;
a low flow detector in serial fluid communication with the flow restrictor, with the low flow detector configured to cut-off the flow when a pressure difference between an inlet and an outlet of the flow restrictor indicates a low flow limit of the flow by being below a predetermined value;
a water filter in fluid communication with the flow restrictor for limitation of the water flow; and
a flow totalization unit configured to add up a volume of water that has flowed through the water filter and having a minimal flow below which the flow totalization unit will not add up a volume of water that has flowed through the water filter and the minimal flow is the low flow limit.

10. The water appliance according to claim 9, wherein the low flow detector is in fluid communication with the flow totalization unit for cutting the flow after filtrating of a predetermined quantity of water by the filter.

* * * * *